(12) United States Patent
Gleissner et al.

(10) Patent No.: US 10,817,060 B2
(45) Date of Patent: Oct. 27, 2020

(54) METHOD AND ARRANGEMENT FOR MANUFACTURING A CONTROL DEVICE OFFERING HAPTIC FEEDBACK

(71) Applicant: PREH GMBH, Bad Neustadt A.D. Saale (DE)

(72) Inventors: Ottmar Gleissner, Hohenroth (DE); Frank Then, Bad Neustadt A.D. Saale (DE)

(73) Assignee: PREH GMBH, Bad Neustadt A.D. Saale (DE)

( * ) Notice: Subject to any disclaimer, the term of this patent is extended or adjusted under 35 U.S.C. 154(b) by 263 days.

(21) Appl. No.: 15/823,602

(22) Filed: Nov. 28, 2017

(65) Prior Publication Data

US 2018/0150139 A1 May 31, 2018

(30) Foreign Application Priority Data

Nov. 29, 2016 (DE) .................. 10 2016 122 978

(51) Int. Cl.
*G06F 3/01* (2006.01)
(52) U.S. Cl.
CPC .................... *G06F 3/016* (2013.01)
(58) Field of Classification Search
CPC .............. A61B 17/00; A61B 17/00234; A61B 17/3423; A61B 2017/00283; B25J 13/088; G05B 19/4189; G06F 3/016
See application file for complete search history.

(56) References Cited

U.S. PATENT DOCUMENTS

| 7,608,038 | B2 * | 10/2009 | Ginsberg | A61B 17/3403 |
| | | | | 600/104 |
| 8,891,924 | B2 * | 11/2014 | Yeung | A61B 17/00234 |
| | | | | 385/117 |
| 9,198,714 | B2 * | 12/2015 | Worrell | A61B 34/76 |
| 9,375,268 | B2 * | 6/2016 | Long | A61N 1/306 |
| 9,789,613 | B2 * | 10/2017 | Yeung | A61B 17/00234 |
| 9,820,768 | B2 * | 11/2017 | Gee | A61F 9/00745 |
| 2004/0050395 | A1 * | 3/2004 | Ueda | A61B 34/73 |
| | | | | 128/899 |
| 2017/0139405 | A1 | 5/2017 | Bodenstein | |

FOREIGN PATENT DOCUMENTS

DE    10 2009 042 777 B4    3/2014

* cited by examiner

*Primary Examiner* — Carl J Arbes
(74) *Attorney, Agent, or Firm* — Norman B. Thot

(57) ABSTRACT

A method of manufacturing a control device comprising an actuator for generating a haptic feedback. The method includes providing at least two flat anchors each of which comprises a connecting element for connection to a support component. The connecting element is arranged differently on each of the flat anchors. An actuator solenoid and the support component are mounted within the control device. A distance between the actuator solenoid and a predetermined point on the support component is determined to obtain a determined distance. One flat anchor is selected from the flat anchors based on an actual distance to the actuator solenoid when the one flat anchor is connected to the support component corresponding to a specific requirement, the actual distance being determined based on the determined distance. The one flat anchor selected is mounted within the control device.

10 Claims, 5 Drawing Sheets a)

b)

c)

METHOD AND ARRANGEMENT FOR MANUFACTURING A CONTROL DEVICE OFFERING HAPTIC FEEDBACK

CROSS REFERENCE TO PRIOR APPLICATIONS

Priority is claimed to German Patent Application No. DE 10 2016 122 978.4, filed Nov. 29, 2016. The entire disclosure of said application is incorporated by reference herein.

FIELD

The present invention relates to a method of manufacturing a control device having at least one electromagnetic actuator for generating haptic feedback. The actuator comprises at least one actuator solenoid and one mobile flat anchor powered by the actuator solenoid. The flat anchor, in turn, is in contact with a surface of the control device via a support component which is to be set in motion for haptic feedback via a motion of the flat anchor.

The present invention also relates to an associated arrangement for manufacturing a control device exhibiting haptic feedback.

BACKGROUND

Electromagnetic actuators having an energizable actuator solenoid and an anchor are often used to enable a switch function in the field of control and/or input devices. Such actuators can also be used for generating haptic effects in control devices. Touch-sensitive input surfaces are, for example, increasingly used in electronic devices. This in particular applies to mobile phones and other mobiles devices, but also to user interfaces in motor vehicles. The user can make inputs via a touch-sensitive input surface in order to initiate specific functions of a device or a motor vehicle. The user can thereby tip a spot on the input surface with his/her fingertips or also slide over a specific region. The position of such touch spots and also motion patterns are detected by sensors; it is, for example, possible to use a matrix made of capacitive sensors. The position data so determined is essentially transmitted to a computing unit which then derives the function desired by the user and executes the function.

In order to subsequently provide a user with feedback on the success of an input process and/or in order to assist the user with the orientation on an input surface, it is known in the art to provide control devices having means for haptic feedback. In order to generate such feedback, the input surface is briefly set in motion so that the user feels a short vibration on his/her finger. The motion can be made to be orthogonal or parallel to the input surface depending on activation. Various mechanisms can also be used to set the input surface in motion. This in particular includes piezoelectric elements and the electromagnetic actuators as already defined.

Flat anchor actuators and plunger anchor actuators can be used as the electromagnetic actuators used. In a flat anchor actuator, a magnetic flat anchor moves to and from a solenoid, whereas in a plunger anchor actuator, a plunger anchor plunges into a core. In both cases, the respective anchor enables a direct or indirect setting in motion of a surface of a control device, in particular a touch-sensitive input surface. The touch-sensitive input surface can, for example, be an input surface of a touch screen or a touch pad. Excitation of such surfaces for efficient haptic feedback requires certain forces which must be generated by one or several actuators.

In the case of an electromagnetic actuator, an electromagnetic field is generated in at least one solenoid by a current pulse in order to move an anchor along a specific way depending on the voltage present in the solenoid. The actuator thereby generates a specific force which can be used for a switch function or activation of a surface of a control device. The forces generated by a flat anchor actuator are thus significantly larger than those generated by a plunger anchor actuator having the same cross section. It is therefore often preferred to make use of flat anchor actuators. Plunger anchor actuators in particular often have capacities which are too low for large systems such as touch screens or touch pads so that flat anchor actuators are typically used herein.

The disadvantage of a flat anchor is that the generated force depends very strongly on the distance of the anchor to the core. This disadvantage occurs in particular in systems where the actuator not only effects simple opening and closing, but is required to work on a touchless basis and without stops. This may be the case, for example, in generating haptic effects on touch-sensitive surfaces because the force generated by a current impulse must be precisely known in order to assure a specific time/way behavior of the surface.

In order to illustrate this relation, FIG. 1 shows various arrangements of anchors relative to the type of solenoids with their inductors. FIG. 1 b) thereby shows a flat anchor 30, whereas FIG. 1 c) shows a plunger anchor 50. The flat anchor 30 moves to and from the solenoid 20, whereas the plunger anchor 50 plunges into the solenoid 20', while moving within its inductor. FIG. 1 a) shows the generated forces F via the actual distance x between the inductor and the anchor for both actuator types. The curve b represents the force development of the flat anchor 30, whereas the curve c represents the force development of the plunger anchor 50. FIG. 1 a) shows that the force F in the flat anchor 30 more strongly depends on the actual distance x than is the case for the plunger anchor 50. When using a flat anchor, the producible force F continuously drops when the actual distance x increases.

When using electromagnetic actuators, in particular when using electromagnetic actuators in control devices, it is also always desirable to keep the cross section and the costs as low as possible. The distance between the anchor and the core should therefore be minimized with a defined maximum deflection to provide an efficient use. Such distance are typically in the range of between 0.1 and 0.8 mm. Manufacture of flat anchor actuators raises the problem of precise positioning of the solenoid body relative to the anchor in the context of the dependence of force generated by a flat anchor on the distance between the anchor and the solenoid (force/way curve) as stated above.

There is therefore a need for solutions of a precise positioning of a flat anchor within an actuator and for calibration of such a system. Manual measurement, for example, via a vernier caliper, of the distance between an anchor and a solenoid in prototypes of flat anchor actuators, is hereby known in practice. Activation of the anchor by energizing the actuator solenoid to operate the actuator can therefore be adapted to the measured distance. This is, however, a very complex and costly method. The final position of the flat anchor can also be changed already during the mounting process and be adjusted to a desired distance. This is, however, relatively elaborate and costly as well.

A measurement device is, for example, described in DE 10 2009 042 777 B4, which is designed to determine an anchor position of an electromagnetic actuator and wherein the measurement device exhibits at least one current sensor and one magnetic field sensor. Following a unique calibration measurement and a characteristic line determined therefrom, it is possible to determine the anchor position via the current flowing through the solenoid as well as via the magnetic field of the actuator. The magnetic field sensor is then mounted outside the casing of the actuator in the range of an electromagnetic stray field of the actuator. Current determination of the position of the anchor is therefore realized following commissioning of the actuator and can only be executed during a current flow. This approach is therefore not useful to determine the position of the anchor and thus also the distance between the anchor and the solenoid during the mounting process.

SUMMARY

An aspect of the present invention is to provide a method and an associated arrangement for manufacturing a control device offering haptic feedback which enables an improvement of the positioning of a flat anchor and the calibration of an actuator.

In an embodiment, the present invention provides a method of manufacturing a control device comprising at least one electromagnetic actuator for generating a haptic feedback to the control device. The at least one electromagnetic actuator comprises at least one actuator solenoid and one flat anchor which is configured to move via an energizing of the at least one actuator solenoid. The one flat anchor is in contact with a surface of the control device via a support component. The surface is configured to be set in motion to provide the haptic feedback via a motion of the one flat anchor. The method includes providing at least two flat anchors. Each of the at least two flat anchors comprises at least one connecting element for connecting the respective one of the at least two flat anchors to the support component. The at least one connecting element is arranged differently on each of the at least two flat anchors. The at least one actuator solenoid and the support component are mounted within the control device. A distance between the at least one actuator solenoid and a predetermined point on the support component is determined so as to obtain a determined distance. The one flat anchor is selected from the at least two flat anchors based on the one flat anchor selected having an actual distance to the at least one actuator solenoid when the one flat anchor selected is connected to the support component which corresponds to a specific requirement, the actual distance being determined based on the determined distance. The one flat anchor selected is mounted within the control device by connecting the at least one connecting element to the support component.

BRIEF DESCRIPTION OF THE DRAWINGS

The present invention is described in greater detail below on the basis of embodiments and of the drawings in which.

DETAILED DESCRIPTION

Figure 1:
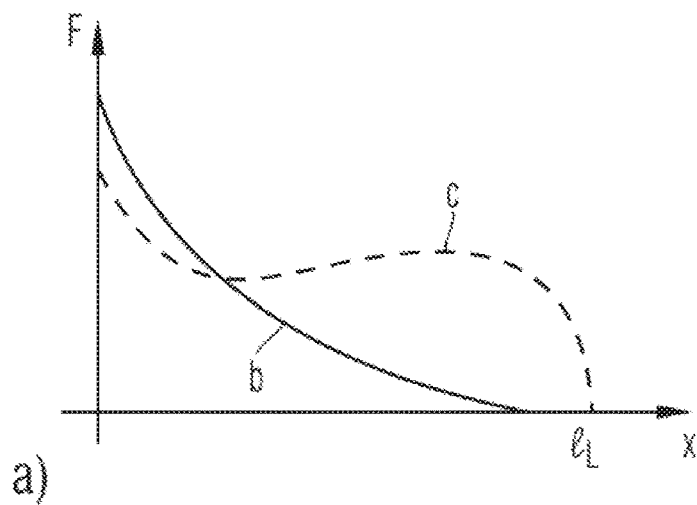
FIG. 1 shows the forces generated in actuators having a flat anchor compared to actuators having a plunger anchor.
Figure 1:
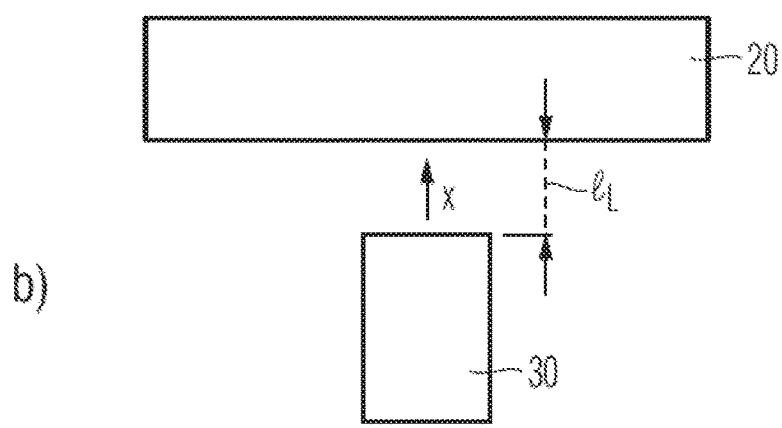
Figure 1:
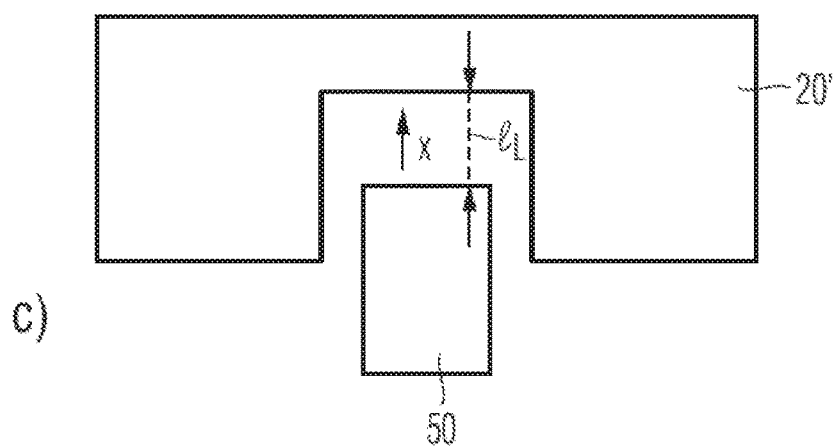

The method according to the present invention is designed to manufacture a control device having at least one electromagnetic actuator for generating haptic feedback on the control device. The actuator comprises at least one actuator solenoid and one mobile flat anchor powered by the actuator solenoid. The flat anchor is in contact with a surface of the control device via a support component which is set in motion for a haptic feedback via a motion of the flat anchor.

The method is characterized by at least the following steps:

a) providing a quantity of at least two flat anchors, each comprising at least one connecting element for connecting the flat anchor to the support component, the respective connecting element being arranged differently on the two flat anchors;

b) mounting at least the actuator solenoid and the support component within the control device;

c) determining a distance d between the actuator solenoid and a predetermined point on the support component;

d) selecting a flat anchor among a quantity of flat anchors, the choice being made of the flat anchor having an actual distance x to the actuator solenoid in the connection to the support component and corresponding to a specific requirement, wherein the actual distance x is determined depending on the determined distance d; and e) mounting the flat anchor selected in step d) within the control device by connecting of its at least one connecting element to the support component.

This method enables selecting the appropriate flat anchor for a slot arising during the production process between the actuator solenoid and a support component. An appropriate flat anchor can be selected and installed during the production process of the control device, thereby facilitating subsequent calibration of the actuator. The flat anchors available can, for example, differ only with respect to the arrangement of the at least one connecting element so that they are identical for the rest. When installing the various flat anchors, the different arrangement of one or several connecting elements provides that a different distance x to the actuator solenoid arises for each flat anchor. Where different distances arise during installation of the support component between the actuator solenoid and the support component, these variations can be compensated very well by selecting and installing a flat anchor appropriate to the distance d previously measured.

Following installation of the selected flat anchor, the resulting actual distance x between the actuator solenoid and the flat anchor is then known with relative precision and can be taken into account when calibrating and triggering the actuator. No additional measurement of the actual distance x between the actuator solenoid and the flat anchor is necessary in its installed state.

The control device can be of various types of input devices which in particular enable the choice and the triggering of functions of an electronic device. It can specifically be an input device within a motor vehicle in which, for example, touch screens or touch pads can be used. In an embodiment of the present invention, the surface of the control device which is to be set in motion for haptic feedback can, for example, be a touch-sensitive input surface. It may comprise touch-sensitive sensors, for example, in the form of a matrix of capacitive sensors, in order to determine the required position data in the case of contact with the input surface.

Such a touch-sensitive surface can be set in motion to be orthogonal or parallel to their extension direction for haptic feedback. In an embodiment of the present invention, the surface can, for example, be activated to be parallel to its extension direction. The input surface in this case is movingly seated within a casing while being directly or indirectly connected to the flat anchor of the electromagnetic anchor. This can, for example, be realized by a support formed of one or more support parts. The actuator subsequently sets the support(s) in motion, which, in turn, is transmitted to the input surface, thereby exciting the latter alongside its extension direction. The distance d is measured in a state where the at least one support component is mounted in its normal rest position.

A control device can thus exhibit one or several actuators in order to set a surface for haptic feedback in motion. Known embodiments provide for an actuator in a central region beneath a touch-sensitive input surface.

A specific requirement when selecting an appropriate flat anchor is to comply with the actual distance x between the flat anchor and the actuator solenoid. Specifically, a nominal distance X is considered which, if possible, should be attained or at least not be undercut. When considering a maximum deflection of the flat anchor, the nominal distance is to be selected to be as small as possible, ranging, for example, from 0.1 to 0.8 mm.

In an embodiment of the present invention, it is provided that, in step d), selection is made of the flat anchor having an actual distance x to the actuator solenoid being connected to the support component, and having the smallest deviation from a defined nominal distance X. This requirement can be limited further by the fact that in step d) selection is made of the flat anchor having an actual distance x to the actuator solenoid, said distance being larger than a defined nominal distance X and having the smallest deviation from a defined nominal distance X. It is thereby assured that the nominal distance X will not be undercut. Any remaining tolerances can be minimized via a targeted activation of the actuator. Following installation of the flat anchor selected in step d), for example, remaining deviations in the control device between the actual distance x and the defined nominal distance X between the flat anchor and the actuator solenoid can be minimized by a targeted activation of the flat anchor during operation of the actuator.

Selection of an appropriate flat anchor can, for example, be realized via a computing unit to which the distance d previously measured is transmitted for a subsequent analysis. Hence, following step c), the distance d is transmitted to a computing unit, which then executes the step d) of the method of the present invention. Such computing unit comprises information as to the dimensions of each flat anchor from the quantity of the flat anchors available and can thereby choose a flat anchor which complies with the desired requirements. The distance d in step c) can thereby be determined using a camera which is connected to the computing unit by data processing technology. For example, following analysis of a camera picture, the computing unit can display an appropriate flat anchor on a screen, which is then subsequently installed in the control device. The installation can be made manually, but can also be made automatically so that the computing unit can also activate a robot directly to install the flat anchor selected among a quantity of flat anchors and to mount the flat anchor selected between the actuator solenoid and the support component of the input surface.

In order to be able to take into account various distances d between the actuator solenoid and the support component, at least one connecting element is formed and arranged on the flat anchors so that a variation of the arrangement generates various actual distances x when installing the respective flat anchor. The arrangement of a connecting element to a flat anchor thereby defines its resulting position opposite to the actuator solenoid. Such a connecting element can, for example, orientate the flat anchor opposite to the support component. In an embodiment of the present invention, it is, for example, provided that at least one connecting element on a flat anchor is a recess in which a corresponding protrusion of the support element is form-fittingly installable. This is therefore a kind of notch/spring system. Other types of interlocking systems can, however, also be used.

A connecting element on a flat anchor can simultaneously serve to orient the flat anchor opposite to the support component and to also firmly attach the flat anchor thereto. It is, however, also possible to provide additional attachment components. Additional fixing means of the respective flat anchor to a support component can be provided at the at least two flat anchors. Such means are in particular at least one long hole. The longitudinal axle of such a long hole can, for example, extend parallel to the motion direction of the flat anchor.

In an embodiment of the present invention, the flat anchor can, for example, be executed as angle trims having two branches positioned in an angle of 90° to each other. In the state of a flat anchor being installed within the control device, the outside surface of a first branch of the angle trim is then orientated towards the actuator solenoid, whereas the at least one connecting element is provided on the second branch. One connecting element is then, for example, provided on opposite sides of the second branch.

The method according to the present invention also comprises an associated arrangement for manufacturing a control device having at least one electromagnetic actuator for generating haptic feedback on the control device. The arrangement of components enables execution of the manufacture method of the present invention.

The arrangement at least exhibits the following components:

a mounting assembly comprising at least one actuator solenoid and at least one support component which is in contact or which can be brought in contact with a surface of the control device which is to be set in motion for haptic feedback, wherein the actuator solenoid and the support component are mounted in an installation position; and a quantity of at least two flat anchors each comprising at least one connecting element to connect the respective flat anchor to the at least one support component, wherein the connecting element is differently arranged on the two flat anchors.

The total system of the control device is therefore, in a first step, preinstalled in a mounting assembly, which comprises at least the actuator solenoid, and one support component, with which a surface of the control device is in contact with or can be brought in contact therewith. A touch-sensitive input surface has therefore also already been preinstalled on the support component or the support component is positioned at least within the mounting assembly so that the input surface can subsequently be mounted. However, the actuator solenoid and the support component are already in their final installation position so that the distance d to be measured between these two components corresponds to the actual distance d following complete mounting of the control device. An anchor is not part of this mounting assembly.

A second component of the arrangement is formed by a quantity of at least two flat anchors, each of which exhibits at least one connecting element, the connecting element being differently arranged on both flat anchors. Such a quantity of flat anchors can be used to select an appropriate flat anchor for varying mounting assemblies. The at least one connecting element on a flat anchor can be a recess in which a corresponding protrusion of the support element is form-fittingly installable. The flat anchors can, for example, only differ in the arrangement of these connecting elements and are otherwise identical. The at least one support component can then, for example, be composed at least in part of a plastic material.

As already demonstrated with respect to the method of the present invention, the flat anchors can then be executed as angle trims and, in the installed state of a flat anchor within the control device, the outside surface of a first branch of the angle trim is orientated towards the actuator solenoid, while the at least one connecting element is provided on the second branch. One connecting element is then, for example, provided on each opposite side of the second branch.

The present invention also comprises a flat anchor for a control device having at least one electromagnetic actuator for generating haptic feedback on the control device. As described, the flat anchor is executed as an angle trim where at least one connecting element is provided on one branch. One connecting element can then, for example, be provided on each opposite side of the second branch. Such an anchor can, for example, in particular be installed in an actuator for generating haptic feedback where a support made of plastic material is used in a control device and on which is mounted a touch-sensitive input surface of a touch screen or touch pad. Such a support can be formed, for example, by a frame in and/or on which are mounted one or several touch input elements. The motion of the anchor is then transmitted via the frame to the input surface in order to activate the latter for haptic feedback.

Rotation of the flat anchor relative to the support may occur due to the torque applied when connecting the flat anchors to the support via a bolted connection. This can be avoided with the at least one connecting element on the flat anchor, where such a connecting element is form-fittingly connected to a corresponding element on the support. The position of the flat anchor is thereby defined relative to the support so that it cannot rotate during subsequent fixing thereof to the support.

Where a flat anchor made of a metal material is also connected via a bolted connection to a support made of plastic material, disadvantages may occur due to the materials used, and in particular due to the different materials used. For example, both materials have different settlement behaviors because their behavior also differs in the case of temperature variations. This may also result in rotation of the flat anchor relative to the support when operating the actuator.

Such disadvantages can be avoided by at least one connecting element on the flat anchor enabling orientation of the latter opposite to one or several support components. Such an orientation results in the flat anchor no longer being moveable in the control device after its mounting to allow its distance to the actuator solenoid to be set. The method according to the present invention can therefore advantageously be used in particular when using such flat anchors. Where several flat anchors are provided with different arrangements of connecting elements, it is possible to specifically select and install the flat anchor so as to enable an optimum realization of a resulting distance x between the actuator solenoid and the flat anchor. The advantages of one flat anchor can thereby be used with a connecting element for orientation of a support component and the resulting disadvantages can be remedied at the same time.

Other advantages, distinctive features, and useful further embodiments of the present invention are set forth in the following description of working examples in the drawings.

Figure 2:
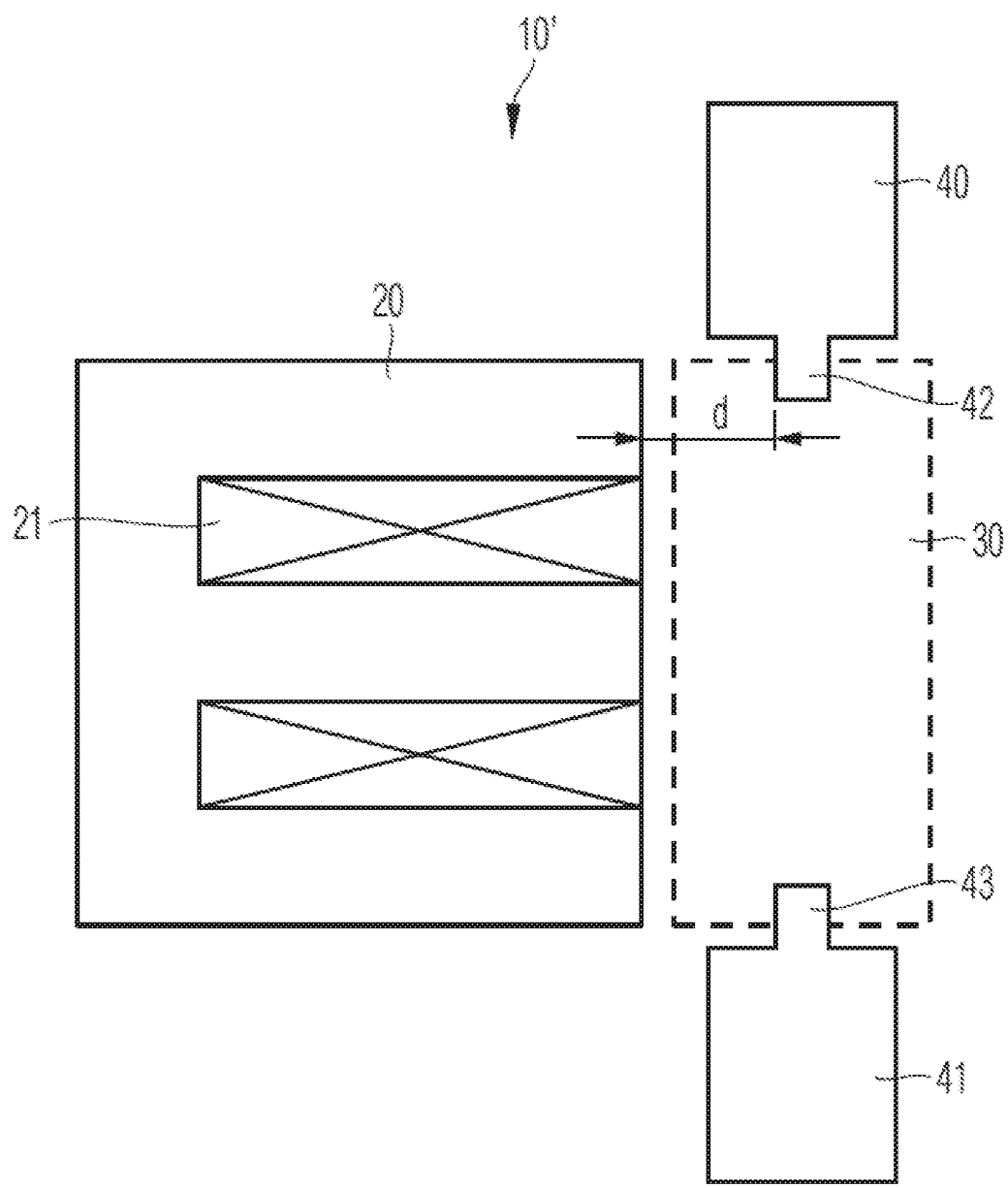
FIG. 2 shows a schematic representation of a mounting assembly having an installed actuator solenoid in a distance d to a support.

The representation shown in FIG. 2 of a mounting assembly 10' schematically shows various components of a control device to be manufactured by the method of the present invention and having an electromagnetic actuator. Only the components of the control device which are essential for the present invention are shown. The mounting assembly 10' comprises at least one solenoid 20 having an actuator solenoid 21. The solenoid 20 can be installed in a casing (not shown in the drawings) or any other environment. Such additional components may also be part of the mounting assembly 10', but are not illustrated in detail.

In a specific distance d to the actuator solenoid 21, there is provided at least one support, which, in the exemplary embodiment of FIG. 2, is formed of at least two support components 40 and 41. The support components 41, 41 can directly or indirectly be brought into contact with a surface of a control device which is to be set in motion for haptic feedback. This surface can, for example, be a surface of a switch or a control button. It can, however, also be a touch-sensitive input surface of a touch screen or a touch pad. The respective surface can already be preinstalled on the support components 40, 41, however, it can also be mounted only following the choice and the mounting of an appropriate flat anchor in the control device.

Both support components 40, 41 comprise protrusions 42 and 43 which are formed in the shape of noses and/or springs, but which can also adopt other shapes to enable a connection of a flat anchor to the support components 40, 41. A flat anchor 30 can therefore be arranged in a distance to the actuator solenoid 21 between the two support components 40, 41. FIG. 2 shows a flat anchor 30 to be positioned as a dotted line only and not as part of the mounting assembly 10'. In the absence of a flat anchor 30, the components shown in FIG. 2 form a mounting assembly 10' which is preinstalled in order to subsequently install an appropriate flat anchor 30 into the mounting assembly 10'. When energizing the actuator solenoid 21, the flat anchor 30 can then be moved to and from the actuator solenoid 21.

The mounting assembly 10' can then adopt various positions relative to the surface of a control device where haptic feedback is to be generated. For example, the surface can extend parallel to the drawing plane of FIG. 2. In such an embodiment, the surface would be activated alongside its extension direction. However, in such an embodiment, the surface could also extend vertically relative to the drawing plane of FIG. 2 and would transversally be activated relative to its extension direction. The respective structure of the control device having an electromagnetic actuator therefore depends, for example, on the desired type of haptic feedback.

The method according to the present invention provides for determining the distance d between the actuator solenoid 21 and a spot on the support components 40 and 41 in a mounting assembly 10'. For example, the distance d can be determined between the actuator solenoid 21 and the protrusions 42, 43, as provided for in the embodiment of FIG. 2. Other spots on the support components 40, 41 can, however, also be selected.

Determination of the distance d can be realized, for example, via a camera shooting a picture of the region between the actuator solenoid 21 and the support components 40, 41. Reference points and a corresponding picture analysis thereby enable a determination of the distance d. This distance d is, for example, transmitted to a computing unit (not shown in the drawings) in order to define a flat anchor matching the measured slot via the distance d.

Figure 3:
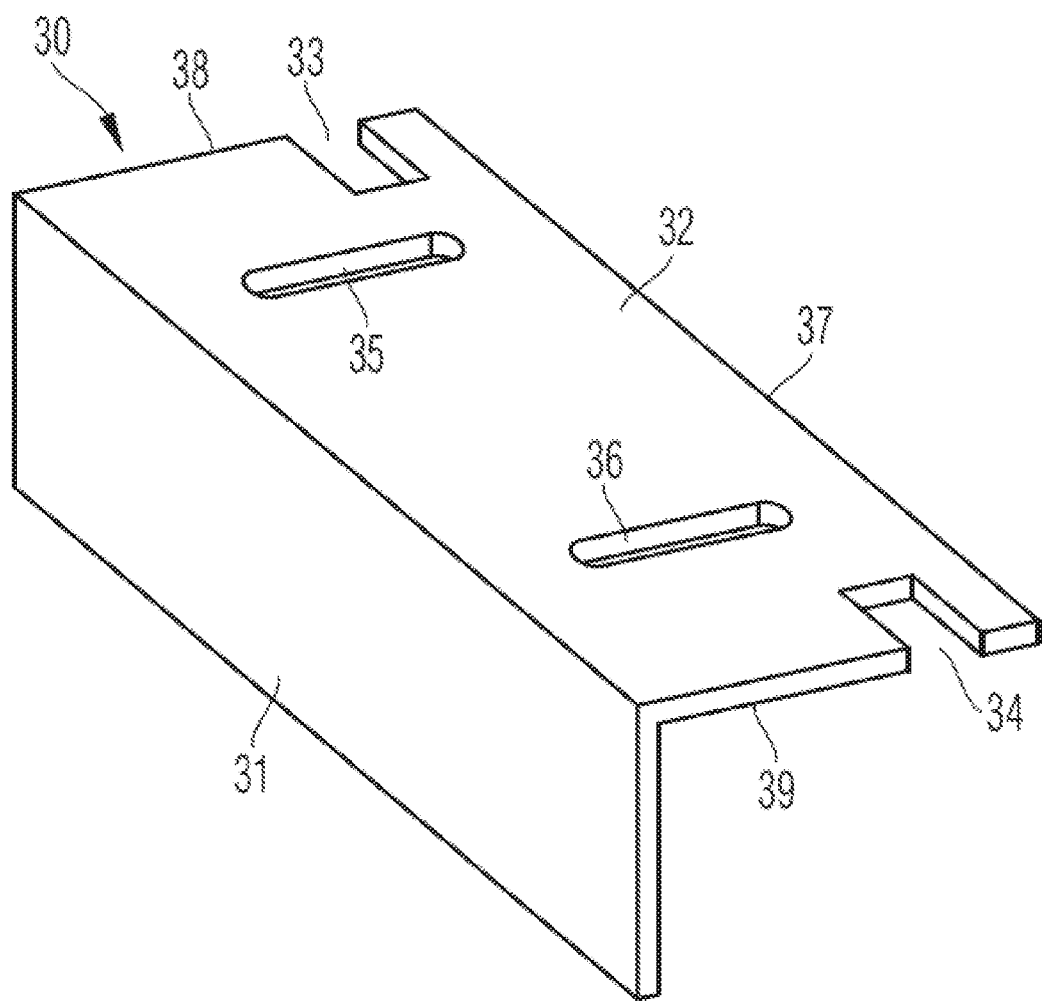
FIG. 3 shows a three-dimensional representation of a first embodiment of a flat anchor in the form of an angle trim.

In order to select an appropriate flat anchor 30, one arrangement of the present invention provides for a quantity of at least two flat anchors 30 to be selected from and adjacent to the mounting assembly 10' already described. The flat anchors 30 are differently formed so that, if possible, an appropriate one of the quantity of flat anchors 30 can be selected. FIG. 3 shows an embodiment of a possible flat anchor 30 installable into a mounting assembly 10'. The flat anchor 30 has the form of an angle trim having two branches 31 and 32 positioned in an angle of 90° to each other. The first branch 31 is provided for the outside surface to be orientated towards an actuator solenoid 21, whereas the angle trim can be connected to the support components 40, 41 and other components of the control device via its second branch 32. Two connecting elements 33 and 34 are provided on the second branch 32 therefor. Connecting elements 33, 34 can, for example, be provided as recesses or notches, where the respective noses or springs 42, 43 of the support components 40, 41 can form-fittingly be installed. Supplemental seats, such as, for example, two long holes 35 and 36, can be provided to enable an additional attachment of the flat anchor 30 to a component of the control device. For example, the connecting elements 33, 34, which are here provided as recesses, can serve only to orientate the flat anchor 30 relative to the support components 40, 41, whereas the attachment as such is provided via bolted connections in the long holes 35, 36.

The flat anchor 30 of FIG. 3 exhibits recesses as connecting elements 33, 34 which are arranged in the immediate proximity to the longitudinal edge 37 of the second branch 32 of the flat anchor 30. Where such a flat anchor 30 is installed in a mounting assembly 10' according to FIG. 2, recesses 33, 34 would be become aligned with the protrusions 42, 43 of the supporting components 40, 41 and the flat anchor 30 would be mounted in line with the actuator 10. The first branch 31 is then arranged relatively next to the actuator solenoid 21, while the remaining distance between the flat anchor 30 and the actuator solenoid 21 could, for example, be too small. Additional flat anchors are available in order to avoid this, the recesses of which are arranged in other positions in order to thereby provide another installation position of the flat anchor.

Figure 4:
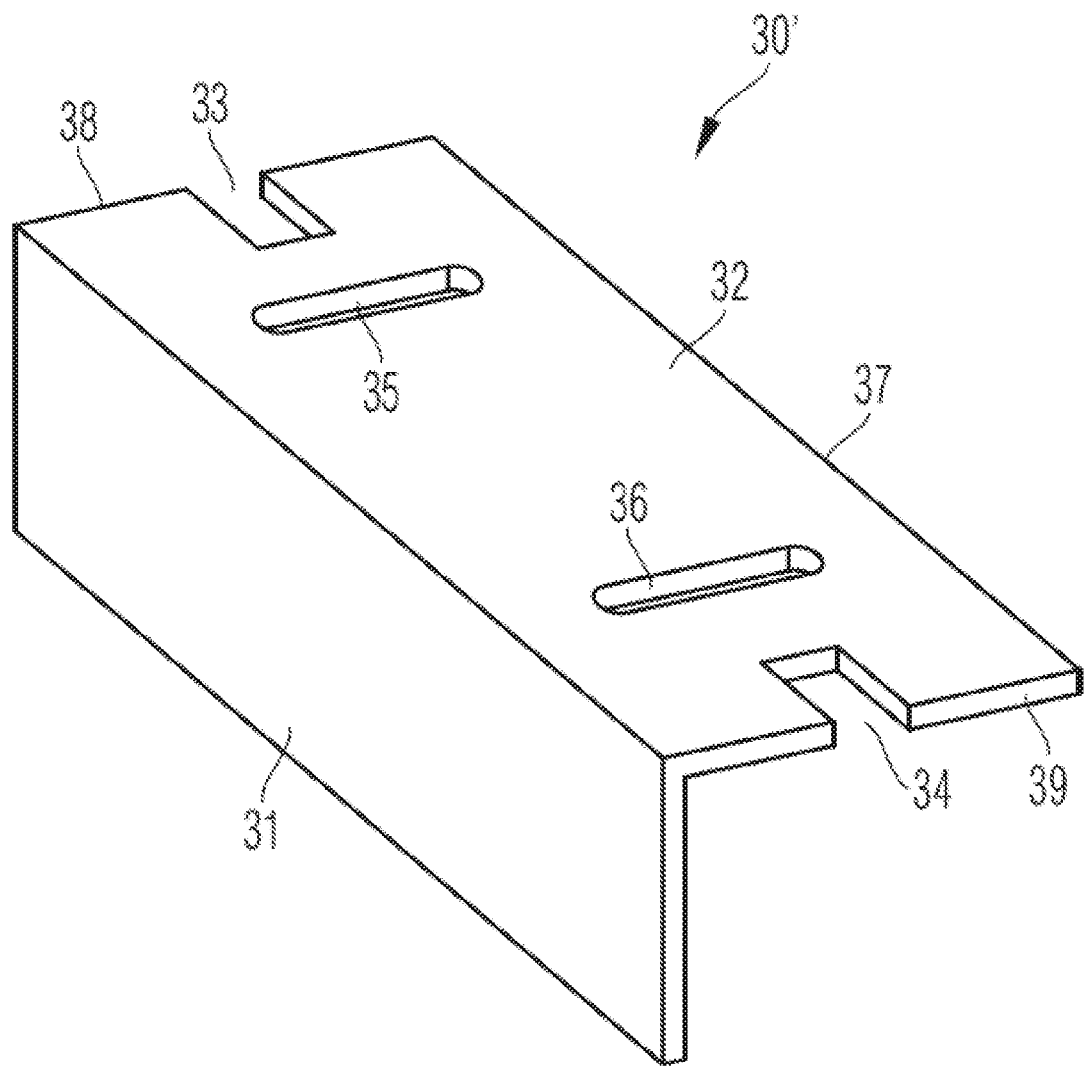
FIG. 4 shows three-dimensional representation of a second embodiment of a flat anchor in the form of an angle trim.

FIG. 4 shows, for example, a second embodiment of a flat anchor 30' in the form which essentially corresponds to FIG. 3 so that identical components are also identified by identical reference numerals. However, connecting elements 33, 34, which are also provided as recesses, are now no longer arranged in the proximity of the longitudinal edge 37 of the second branch 32 but approximately in the center of both transversal edges 38 and 39. When installing flat anchors 30' into a mounting assembly 10' according to FIG. 2, the first branch 31 would be more distant from the actuator solenoid than the flat anchor 30 of FIG. 3. The flat anchor 30' could therefore be appropriate for creating a specific nominal distance X to the actuator solenoid 21. The quantity of flat anchors available can comprise additional embodiments, wherein other distances between the actuator solenoid 21 and the flat anchor 30' will result.

Figure 5:
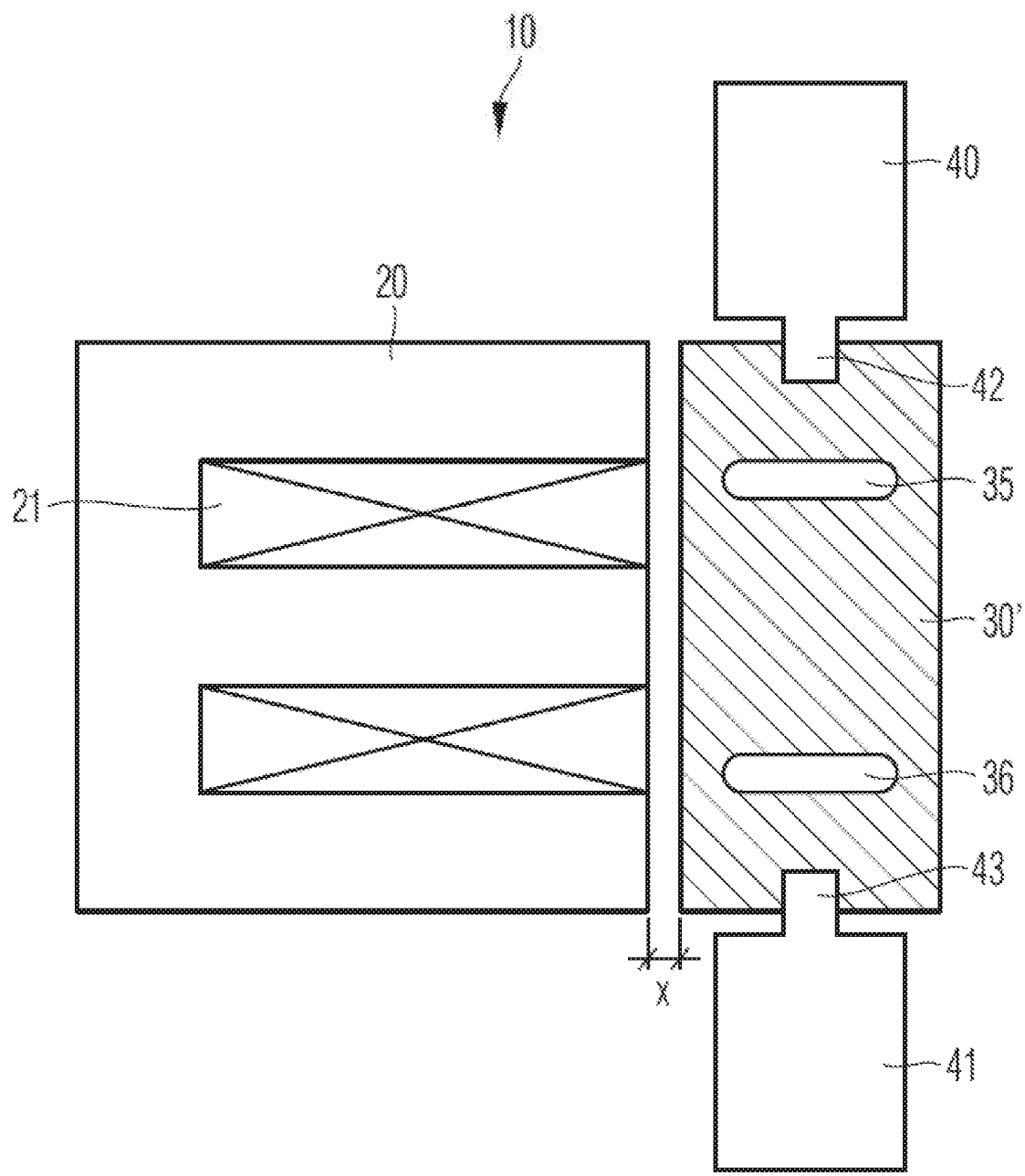
FIG. 5 shows an actuator having an installed flat anchor.

FIG. 5 shows an actuator 10 with an installed flat anchor 30'. Due to the installation, an actual distance x is created between the actuator solenoid 21 and the flat anchor 30'. The flat anchor which can, for example, be selected among the quantity of flat anchors available, is the one the actual distance x of which exhibits the smallest deviation from a nominal distance X. This nominal distance X depends, for example, on the defined maximum deflection of the flat anchor 30'. With such a maximum deflection, the remaining residual distance between the actuator solenoid 21 and the flat anchor 30' is to be minimized, typically resulting in nominal distances X of 0.1 to 0.8 mm.

In order for the nominal distance X not to fall below its value, it can be provided that the flat anchor, where the resulting actual distance x is larger than a nominal distance X and which in addition exhibits the smallest deviation from nominal distance X, is selected among the quantity of flat anchors available. An appropriate flat anchor is therefore selected depending on the distance d determined in the mounting assembly 10', where the actual distance x to the actuator solenoid following its installation is as small as possible while the flat anchor can still move freely within its maximum deflection. The nominal distance X will, for example, not be zero.

In order to enable realization of such a selection of an appropriate flat anchor from a quantity of various flat anchors, the resulting actual distance x is determined for various flat anchors in a first step which results for various distances d between the actuator solenoid 21 and the support components 40, 41. The actual distance x resulting for various flat anchors during the installation process is thus known for various distances d. Such an allocation is shown as an example in Table 1 for the distances d=3.6 mm and d=3.6 mm. Table 1 can also be changed by any other distance d and by more or less types of flat anchors. Table 1 therefore only serves to describe a basic principle of the present invention.

TABLE 1

| Distance d = 3.6 mm | | Distance d = 3.7 mm | |
|---|---|---|---|
| Type of Flat Anchor | Actual Distance x [mm] | Type of Flat Anchor | Actual Distance x [mm] |
| A | 0.85 | A | 0.95 |
| B | 0.8 | B | 0.9 |
| C | 0.7 | C | 0.8 |
| D | 0.6 | D | 0.7 |
| E | 0.5 | E | 0.6 |
| F | 0.4 | F | 0.5 |
| G | 0.3 | G | 0.4 |
| G | 0.2 | G | 0.3 |
| I | 0.1 | I | 0.2 |
| J | 0.5 | J | 0.15 |

Where a nominal distance X is to be complied with for a distance d measured in a preinstalled mounting assembly, one determines in a first step whether the nominal distance X can precisely be attained by an available flat anchor (i.e., x=X). The associated flat anchor is selected and installed accordingly. Where, for example, in the exemplary embodiment of Table 1, a distance d=3.6 mm is determined between the actuator solenoid 21 and the support components 40, 41 and where a nominal distance X of 0.4 mm is to be attained, a flat anchor of type F would be selected. For a measured distance d=3.7 mm, however, a flat anchor of type G would be selected.

Where, however, the nominal distance X comes to 0.45 mm and the distance d to 3.6 mm, no flat anchor complying precisely with this requirement would be available. In this case, one could select a flat anchor where the nominal distance X does not fall below its value and where the deviation therefrom is as low as possible. In the exemplary embodiment of Table 1, this would be the case for the flat anchor of type E, wherein an actual distance x of 0.5 mm would arise.

It is to be noted that the characteristics as individually outlined in the appended claims can be combined with each other in any technically reasonable way showing additional embodiments of the present invention. The description also characterizes and specifies the present invention, in particular by making reference to the associated drawings. The present invention is not limited to embodiments described herein; reference should be had to the appended claims.

LIST OF REFERENCE NUMERALS

10 Actuator
10' Mounting assembly
20, 20' Solenoid
21 Actuator solenoid
30, 30' Flat anchor (angle trim)
31 First branch
32 Second branch
33, 34 Connecting element (recess, notch)
35, 36 Long hole
37 Longitudinal edge
38, 39 Transversal edge
40, 41 Support component
42, 43 Protrusion (convexity, nose, spring)
50 Plunger anchor
d Distance
F Generated forces
x Actual distance
X Nominal distance

What is claimed is:

1. A method of manufacturing a control device comprising at least one electromagnetic actuator for generating a haptic feedback to the control device,
wherein,
the at least one electromagnetic actuator comprises at least one actuator solenoid and one flat anchor which is configured to move via an energizing of the at least one actuator solenoid, and
the one flat anchor is in contact with a surface of the control device via a support component, the surface being configured to be set in motion to provide the haptic feedback via a motion of the one flat anchor,
the method comprising:
providing at least two flat anchors, each of the at least two flat anchors comprising at least one connecting element for connecting the respective one of the at least two flat anchors to the support component, the at least one connecting element being arranged differently on each of the at least two flat anchors;
mounting the at least one actuator solenoid and the support component within the control device;
determining a distance between the at least one actuator solenoid and a predetermined point on the support component so as to obtain a determined distance;
selecting the one flat anchor from the at least two flat anchors based on the one flat anchor selected having an actual distance to the at least one actuator solenoid when the one flat anchor selected is connected to the support component which corresponds to a specific requirement, the actual distance being determined based on the determined distance; and
mounting the one flat anchor selected within the control device by connecting the at least one connecting element to the support component.

2. The method as recited in claim 1, wherein the surface of the control device which is be set in motion for the haptic feedback via the motion of the one flat anchor is a touch-sensitive input surface.

3. The method as recited in claim 1, wherein the at least two flat anchors differ only with respect to an arrangement of the at least one connecting element.

4. The method as recited in claim 1, wherein the selecting of the one flat anchor is based on the actual distance of the respective at least two flat anchors, when connected to the support component, to the actuator solenoid having a smallest deviation from a defined nominal distance.

5. The method as recited in claim 1, wherein the selecting of the one flat anchor is based on the actual distance of the respective at least two flat anchors to the actuator solenoid, when connected to the support component, being larger than a defined nominal distance and having a smallest deviation from the defined nominal distance.

6. The method as recited in claim 1, further comprising:
transmitting the determined distance d to a processing unit,
wherein,
the selecting of the one flat anchor is performed by the processing unit.

7. The method as recited in claim 1, wherein,
at least one of the at least one connecting element on the one flat anchor is provided as a recess,
the support component comprises a protrusion, and
the protrusion is configured to be form-fittingly installable in the recess.

8. The method as recited in claim 1, wherein,
the one flat anchor is provided as an angle trims which comprises a first branch and a second branch,
an outside surface of the first branch is orientated towards the at least one actuator solenoid in an installed state of the one flat anchor within the control device, and
the at least one connecting element is provided on the second branch.

9. The method as recited in claim 8, wherein,
the second branch comprises two opposite sides, and
one of the at least one connecting element is provided on one of the two opposite sides of the second branch.

10. The method as recited in claim 1, wherein the determining of the distance d between the at least one actuator solenoid and the predetermined point on the support component is performed by a camera.

* * * * *